(12) United States Patent
Watanabe et al.

(10) Patent No.: US 12,710,325 B2
(45) Date of Patent: Aug. 18, 2026

(54) OPTICAL SENSOR

(71) Applicant: Murata Manufacturing Co., Ltd., Nagaokakyo (JP)

(72) Inventors: Hiroshi Watanabe, Nagaokakyo (JP); Koichi Inoue, Nagaokakyo (JP); Takatoshi Kato, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 75 days.

(21) Appl. No.: 19/018,450

(22) Filed: Jan. 13, 2025

(65) Prior Publication Data

US 2025/0146894 A1 May 8, 2025

Related U.S. Application Data

(63) Continuation of application No. PCT/JP2023/030017, filed on Aug. 21, 2023.

(30) Foreign Application Priority Data

Sep. 7, 2022 (JP) ................................ 2022-142087

(51) Int. Cl.
*G01L 5/105* (2020.01)
*G01S 7/48* (2006.01)
(Continued)

(52) U.S. Cl.
CPC ............ *G01L 5/105* (2013.01); *G01S 7/4808* (2013.01); *G01S 7/4811* (2013.01); *G01S 7/4815* (2013.01); *G01S 17/48* (2013.01)

(58) Field of Classification Search
CPC ...... G01L 5/105; G01S 7/4808; G01S 7/4811; G01S 7/4815; G01S 17/48
See application file for complete search history.

(56) References Cited

U.S. PATENT DOCUMENTS

2005/0163509 A1 7/2005 Kobayashi et al.
2010/0155579 A1 6/2010 Torres-Jara
2010/0253650 A1* 10/2010 Dietzel ................ G06F 3/0414 73/800

FOREIGN PATENT DOCUMENTS

JP S6258725 U 4/1987
JP S637340 U 1/1988
(Continued)

OTHER PUBLICATIONS

International Search Report in PCT/JP2023/030017, mailed Sep. 19, 2023, 4 pages.
(Continued)

*Primary Examiner* — Jamil Ahmed
(74) *Attorney, Agent, or Firm* — Keating & Bennett, LLP

(57) ABSTRACT

An optical sensor includes two light emitters with the same or substantially the same temperature dependence of luminous intensity of light. A reflector reflects and diffuses light emitted by the light emitters such that a portion of the reflected light is incident on a light receiver. An elastic support supports the reflector, and deforms and changes a relative position of the reflector and the light emitters and the light receiver. A processor calculates a physical quantity depending on an amount of deformation of the elastic support based a ratio between two amounts of light received by the light receiver when respective light emitters emit light at different timings. The light emitters and the light receiver are fixed relative to each other, and a distance from one of the light emitters to the light receiver is different from a distance from another of the light emitters to the light receiver.

18 Claims, 9 Drawing Sheets

(51) Int. Cl.

| | |
|---|---|
| ***G01S 7/481*** | (2006.01) |
| ***G01S 17/48*** | (2006.01) |

(56) References Cited

FOREIGN PATENT DOCUMENTS

| | | | |
|---|---|---|---|
| JP | H1140146 | U | 9/1989 |
| JP | H0686042 | U | 12/1994 |
| JP | 2001169394 | A | 6/2001 |
| JP | 2001296310 | A | 10/2001 |
| JP | 2010539474 | A | 12/2010 |
| JP | 2019153683 | A | 9/2019 |
| WO | 2021033455 | A1 | 2/2021 |

OTHER PUBLICATIONS

Written Opinion in PCT/JP2023/030017, mailed Sep. 19, 2023, 4 pages.

* cited by examiner 10
50

10B
10
10A
15
40
30
21
22
51
50
PROCESSING UNIT
60

OPTICAL SENSOR

CROSS REFERENCE TO RELATED APPLICATIONS

This application claims the benefit of priority to Japanese Patent Application No. 2022-142087 filed on Sep. 7, 2022 and is a Continuation Application of PCT Application No. PCT/JP2023/030017 filed on Aug. 21, 2023. The entire contents of each application are hereby incorporated herein by reference.

BACKGROUND OF THE INVENTION

1. Field of the Invention

The present invention relates to optical sensors.

2. Description of the Related Art

A known optical sensor for measuring a force distribution detects force or deformation optically (Japanese Unexamined Patent Application Publication No. 2010-539474). The optical sensor disclosed in Japanese Unexamined Patent Application Publication No. 2010-539474 includes a deformable opto-mechanical layer including at least one light emitting source, a detector responsive to the light emitted by the light emitting source, and an optical cavity. The light responsive properties of the optical cavity change in response to the deformation of the opto-mechanical layer, and this change is detected as the change in the amount of light received by the detector.

If the luminous intensity of the light emitting source (light emitter) changes, for example, due to a change in ambient temperature, the amount of light received by the detector (light receiver) is affected, which decreases the accuracy in calculating the deformation of the opto-mechanical layer and the magnitude of the force acting thereon.

SUMMARY OF THE INVENTION

Example embodiments of the present invention provide optical sensors that are each not easily affected by a change in ambient temperature.

According to an example embodiment of the present invention, an optical sensor includes two light emitters with a same or substantially a same temperature dependence of luminous intensity of light, a light receiver, a reflector to reflect and diffuse light emitted by the light emitters and positioned such that a portion of the reflected light is incident on the light receiver, an elastic support to support the reflector with respect to the two light emitters and the light receiver and deformable due to an external force to change a relative position of the reflector with respect to the two light emitters and the light receiver, and a processor configured or programmed to calculate a physical quantity that depends on an amount of deformation of the elastic support based on a ratio between two amounts of light received by the light receiver when respective ones of the two light emitters emit light at different timings. In the optical sensor, the two light emitters and the light receiver are fixed relative to each other, and a distance from one of the two light emitters to the light receiver is different from a distance from another light emitter of the two light emitters to the light receiver.

According to an example embodiment of the present invention, an optical sensor includes a light emitter, two light receivers with a same or substantially a same temperature dependence of sensitivity, a reflector to reflect light emitted by the light emitter and positioned such that a portion of the reflected light is incident on the two light receivers, an elastic support to support the reflector with respect to the light emitter and the two light receivers and deformable due to an external force to change a relative position of the reflector with respect to the light emitter and the two light receivers, and a processor configured or programmed to calculate a physical quantity that depends on an amount of deformation of the elastic support based on a ratio between two amounts of light received by respective ones of the two light receivers when the light emitter emits light. In the optical sensor, the light emitter and the two light receivers are fixed relative to each other, and a distance from one of the two light receivers to the light emitter is different from a distance from another light receiver of the two light receivers to the light emitter.

According to example embodiments of the present invention, the influence of the temperature dependence of the luminous intensity of the light emitters can be reduced by calculating the ratio between the amounts of light received when two light emitters emit light at different timings. Alternatively, the influence of the temperature dependence of the e luminous intensity of the light emitters can be reduced by calculating the ratio between the amounts of light received by two light receivers when the light emitter emits light. This improves the accuracy in measuring the physical quantity that depends on the amount of deformation of the elastic support.

The above and other elements, features, steps, characteristics and advantages of the present invention will become more apparent from the following detailed description of the example embodiments with reference to the attached drawings.

BRIEF DESCRIPTION OF THE DRAWINGS

FIG. 8 is a schematic view illustrating a positional relationship of the light emitters, the supplementary light emitters, the light receiver, and the reflector of the optical sensor of Example 4.

DETAILED DESCRIPTION OF THE EXAMPLE EMBODIMENTS

Example embodiments of the present invention will be described in detail below with reference to the drawings.

Example 1

An optical sensor according to Example 1 of an example embodiment of the present invention will be described with reference to FIGS. 1A to 4B.

Figures 1A, 1B, 1C:
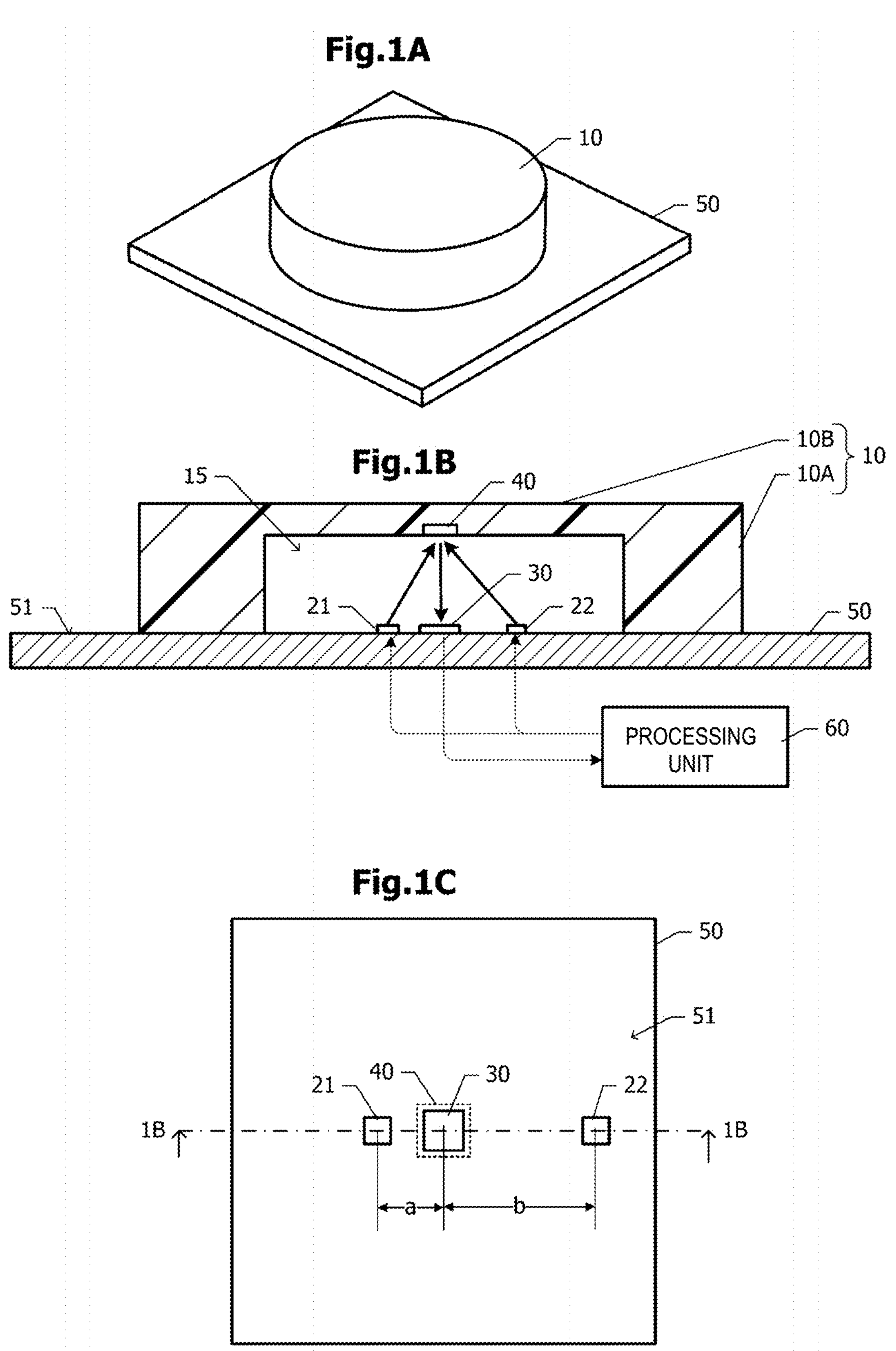
FIG. 1A is a perspective view illustrating an optical sensor according to Example 1 of an example embodiment of the present invention.
FIG. 1B is a cross-sectional view illustrating the optical sensor of Example 1.
FIG. 1C is a view illustrating a positional relationship of light emitters and a light receiver when a first plane is viewed in plan.

FIG. 1A is a perspective view illustrating the optical sensor of Example 1. The optical sensor of Example 1 includes a substrate 50 and an elastic support 10. The elastic support 10 is attached to one surface of the substrate 50. The elastic support 10 has a cylindrical shape, and a cavity is defined by the elastic support 10 and the substrate 50. The elastic support 10 is made, for example, of an elastic material such as a black-colored silicone rubber. When an external force is applied to the elastic support 10 in a direction normal or substantially normal to the surface of the substrate 50, the elastic support 10 deforms elastically and the height of the elastic support 10 changes.

FIG. 1B is a cross-sectional view illustrating the optical sensor of Example 1. The elastic support 10 is attached to the surface of the substrate 50. The elastic support 10 includes a side-wall portion 10A and a top-wall portion 10B. The side-wall portion 10A has a hollow cylindrical shape. One end of the side-wall portion 10A is fixed to the substrate 50, and the other end is covered by the top-wall portion 10B. In other words, the elastic support 10 includes a bottomed cylindrical shape with the opening facing the substrate 50, and the opening is closed by the substrate 50. The substrate 50 and the elastic support 10 thus define a hollow space 15 or the cavity.

Two light emitters 21 and 22 and a light receiver 30 are provided on a surface of substrate 50 that is exposed to the space 15. A plane on which the two light emitters 21 and 22 and the light receiver 30 are located is referred to as a "first plane 51". For example, light-emitting diodes (LEDs) are used for the light emitters 21 and 22. Other solid light emitters, for example, such as vertical-cavity surface-emitting lasers (VCSELs), may be used in place of the LEDs.

A reflector 40 is attached to the top-wall portion 10B so as to oppose the light receiver 30. When a force is applied and deforms the elastic support 10, the position of the reflector 40 changes relative to the light emitters 21 and 22 and the light receiver 30. For example, the height of the reflector 40 from the first plane 51 changes.

The reflector 40 reflects and diffuses most of the light coming from the light emitters 21 and 22. In other words, the light, which is emitted by the light emitters 21 and 22 and is reflected and diffused by the reflector 40, is observed in every direction with a uniform or substantially uniform intensity regardless of observation directions. The inside surface of the elastic support 10 is colored black and hardly reflects the light emitted by the light emitters 21 and 22.

The luminous intensity of the light emitted by the light emitters 21 and 22 is the same or almost the same in a wide range of directions including the direction toward the reflector 40. For example, the luminous intensity of the light emitted by the light emitters 21 and 22 toward the reflector 40 is uniform or substantially uniform at the reflection surface of the reflector 40. Even if the elastic support 10 deforms and the position of the reflector 40 changes within a certain range, the luminous intensity is still uniform or substantially uniform at the reflection surface.

The light emitters 21 and 22 to be used have the same or substantially the same degree of temperature dependence of the luminous intensity. For example, the slope of the change in luminous intensity with respect to the change in temperature is the same or substantially the same for both light emitters 21 and 22. For example, it is preferable to use products with the same model number for the light emitters 21 and 22. For example, it is preferable to use products of the same lot, and it is more preferable to use products made from the same wafer.

A processor 60 is configured or programmed to control the light emission of the light emitters 21 and 22. The light receiver 30 outputs signals to the processor 60. The configuration and function of the processor 60 will be described later with reference to FIG. 2.

FIG. 1C is a view illustrating a positional relationship of the light emitters 21 and 22 and the light receiver 30 when the first plane 51 is viewed in plan. FIG. 1B illustrates the cross section taken along the dash-dot line 1B-1B in FIG. 1C. In FIG. 1C, the reflector 40 is positioned on a straight line that is drawn perpendicularly or substantially perpendicularly to the first plane 51 so as to pass through the light receiver 30. More specifically, the above expression "to pass through the light receiver 30" means that the straight line passes through the geometric center of the receiving surface of the light receiver 30.

The distance between the light receiver 30 and the light emitter 21 is referred to as a "distance a", and the distance between the light receiver 30 and the light emitter 22 is referred to as a "distance b". The above distances are defined as the distances from the geometric center of the receiving surface of the light receiver 30 to the geometric centers of respective light-emitting regions of the light emitters 21 and 22. In the present specification, the geometric centers of the light-emitting regions of the light emitters 21 and 22 are referred to as representative points of the light emitters 21 and 22, respectively. The geometric center of the receiving surface of the light receiver 30 is referred to as the representative point of the light receiver 30.

The representative points of the light receiver 30 and the light emitters 21 and 22 are positioned on the same straight line, and the light receiver 30 is provided between the light emitter 21 and the light emitter 22. Note that the distance a is not equal to the distance b. In other words, the representative points of the light emitters 21 and 22 are disposed so as to deviate from point symmetry positions with respect to the representative point of the light receiver 30.

Figure 2:
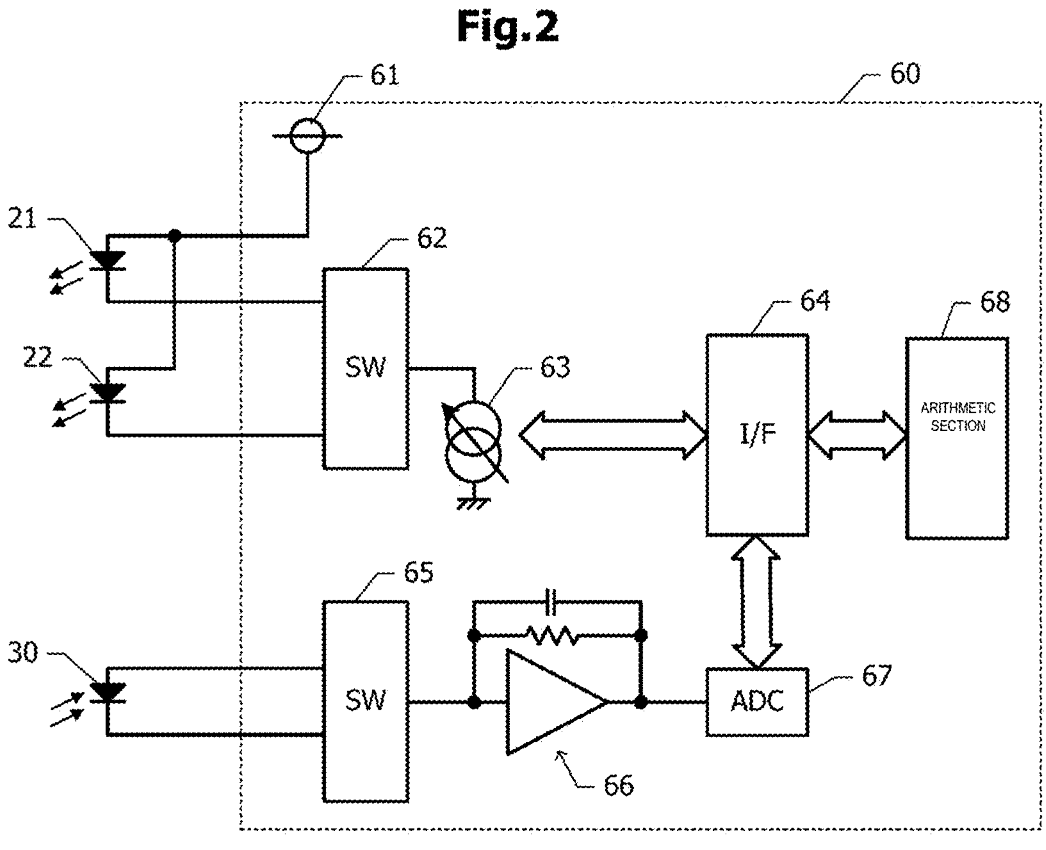
FIG. 2 is a block diagram illustrating a processor of the optical sensor of Example 1.

FIG. 2 is a block diagram illustrating the processor 60 of the optical sensor according to Example 1. The anodes of respective light emitters 21 and 22 are coupled to a power source 61, and the cathodes thereof are coupled to a light emitter driver 63 via a switch matrix 62. An arithmetic section 68 is configured or programmed to control the light emitter driver 63 and the switch matrix 62 via an interface section 64. When one of the light emitters 21 and 22 is selected using the switch matrix 62, the selected light emitter emits light.

The light receiver 30 outputs an electric current corresponding to the amount of light received. The current is input into a transimpedance amplifier 66 via a switch matrix 65. The transimpedance amplifier 66 converts the current received from the light receiver 30 into a voltage signal, and the voltage signal is subsequently input into an AD converter 67. The AD converter 67 converts the voltage signal into a digital signal, and the digital signal is input into the arithmetic section 68 via the interface section 64.

The arithmetic section 68 causes the two light emitters 21 and 22 to emit light at different timings. The arithmetic section 68 thus obtains an amount of light received by the light receiver 30 when one of the light emitters 21 and 22 emits light. The arithmetic section 68 also obtains another amount of light received by the light receiver 30 when the other one of the light emitters 21 and 22 emits light. Subsequently, the arithmetic section 68 calculates the ratio between two amounts of light received and obtains the amount of deformation of the elastic support 10 based on the calculated ratio.

Figure 3:
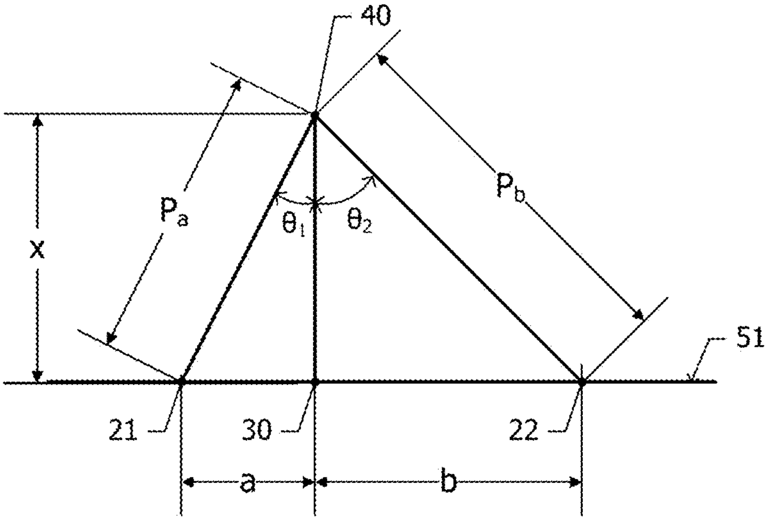
FIG. 3 is a schematic view illustrating a positional relationship of the light emitters, the light receiver, and a reflector.

Next, a non-limiting example of a method of obtaining the amount of deformation of the elastic support 10 is described concretely with reference to FIG. 3.

FIG. 3 is a schematic view illustrating a positional relationship of the light emitters 21 and 22, the light receiver 30, and the reflector 40. In FIG. 3, the light emitters 21 and 22 and the light receiver 30 are indicated by their representative points. The representative point of the reflector 40 is defined as a point of intersection at which a straight line drawn normal to the first plane 51 and passing through the representative point of the light receiver 30 intersects the reflection surface of the reflector 40. In FIG. 3, the reflector 40 is indicated by its representative point. In the following description with reference to FIG. 3, the representative points of the light emitters 21 and 22, the representative point of the light receiver 30, and the representative point of the reflector 40 may be referred to simply as the light emitters 21 and 22, the light receiver 30, and the reflector 40, respectively.

As described above with reference to FIG. 1C, the distance a is the distance between the light receiver 30 to the light emitter 21, and distance b is the distance between the light receiver 30 to the light emitter 22. In addition, reference sign "x" denotes the distance between the light receiver 30 and the reflector 40. When a force is applied to the top-wall portion 10B (see FIG. 1B), the elastic support 10 deforms and causes the distance x to decrease.

The distance between the reflector 40 and the light emitter 21 is denoted by reference sign "$P_a$", and the distance between the reflector 40 and the light emitter 22 is denoted by reference sign "$P_b$". The luminous intensity of the light emitters 21 and the luminous intensity of the light emitters 22 are denoted by reference signs "$G_1$" and "$G_2$", respectively. The reflectivity of the reflector 40 is denoted by reference sign "α". An angle between the line segment connecting the reflector 40 and the light emitter 21 and the line segment connecting the reflector 40 and the light receiver 30 is denoted by reference sign "$\theta_1$". Similarly, an angle between the line segment connecting the reflector 40 and the light emitter 22 and the line segment connecting the reflector 40 and the light receiver 30 is denoted by reference sign "$\theta_2$".

The distance $P_a$ and the distance $P_b$ are obtained from the following equations.

Equations 1

$$P_a = \sqrt{a^2 + x^2} \qquad (1)$$

$$P_b = \sqrt{b^2 + x^2}$$

When the light emitters 21 and 22 are caused to emit light, respective amounts of light received $L_1$ and $L_2$ of the light receiver 30 are obtained from the following equations.

Equations 2

$$L_1 = \frac{\alpha}{x^2}\left[\frac{G_1}{P_a^2}\cos\theta_1\right] = \frac{\alpha}{x^2}\frac{G_1}{(a^2 + x^2)^{3/2}} \qquad (2)$$

$$L_2 = \frac{\alpha}{x^2}\left[\frac{G_2}{P_b^2}\cos\theta_2\right] = \frac{\alpha}{x^2}\frac{G_2}{(b^2 + x^2)^{3/2}}$$

The ratio of the amount of light received $L_2$ to the amount of light received $L_1$ is expressed in the following equation.

Equation 3

$$\frac{L_2}{L_1} = \frac{G_2(a^2 + x^2)^{3/2}}{G_1(b^2 + x^2)^{3/2}} \qquad (3)$$

Even if the luminous intensities $G_1$ and $G_2$ of the light emitters 21 and 22 depend on temperature, $G_2/G_1$ in the right side of Equation 3 does not depend on temperature and remains constant insofar as the slope of the change in luminous intensity with respect to the change in temperature is the same or substantially the same. In addition, the distance a and the distance b in the right side of Equation 3 remain constant or substantially constant. Accordingly, the ratio $L_2/L_1$ between the amounts of light received depends only on the distance x.

The arithmetic section 68 (see FIG. 2) calculates the ratio $L_2/L_1$ between the amounts of light received and obtains the distance x on the basis of the calculation results. Moreover, the arithmetic section 68 obtains, from the distance x, the amount of deformation of the elastic support 10 (see FIG. 1B) in the x direction (i.e., in the direction normal or substantially normal to the first plane 51). For example, when no load is applied to the elastic support 10, a reference value can be set for the distance x, and the deviation of the distance x from the reference value can be defined as the amount of deformation of the elastic support 10.

Figure 4A:
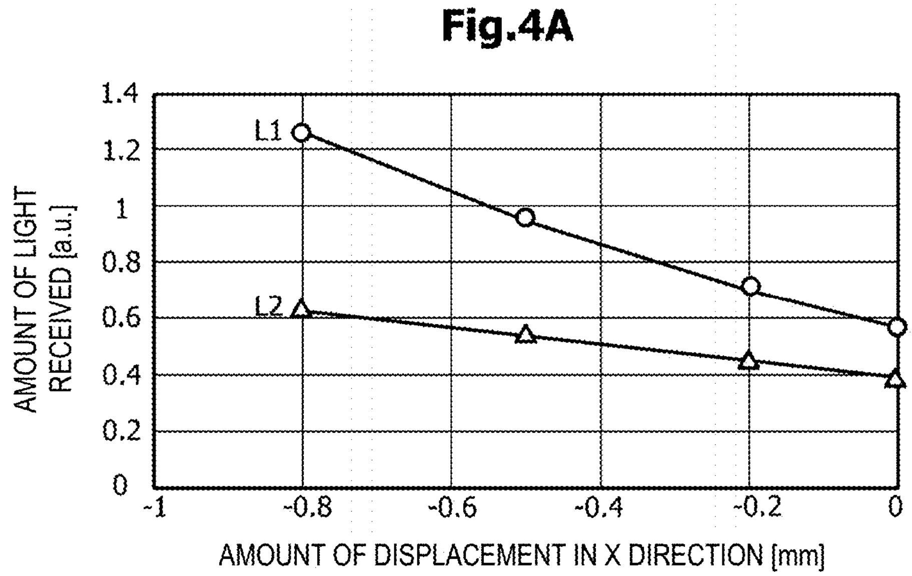
FIG. 4A is a graph illustrating a relationship between an amount of change in a distance x and amounts of light received $L_1$ and $L_2$ according to results of simulation.

FIG. 4A is a graph illustrating a relationship between an amount of displacement of the reflector 40 in the x direction and the amounts of light received $L_1$ and $L_2$ according to the results of simulation. In this graph, the x direction is the direction normal or substantially normal to the first plane 51. The horizontal axis of the graph represents the amount of displacement in millimeter in the x direction, and the vertical axis represents the amount of light received in arbitrary units. The amount of displacement in the x direction is zero when no force is applied to the elastic support 10. Simulation was performed for a case in which the top-wall portion 10B (see FIG. 1B) of the elastic support 10 was displaced toward the substrate 50 (i.e., the amount of displacement in the x direction is negative). Conditions of the simulation were set as follows: the luminous intensities $G_1$ and $G_2$ of respective light emitters 21 and 22 were the same or substantially the same, a=about 1.2 mm, b=about 1.8 mm, and α=about 0.98, the reference value for the distance x was about 1.8 mm, the reflectivity of the elastic support 10 excluding the reflector 40 was about 0.05, and about 80% of the light were diffused in the Lambertian distribution at the reflector 40 and about 20% of the light was reflected specularly. The surface of the substrate 50 was set to absorb light.

In FIG. 4A, circle marks and triangle marks in the graph represent the amounts of light received $L_1$ and $L_2$, respectively, when each of the light emitters 21 and 22 emits light. As the top-wall portion 10B approaches the substrate 50 (in other words, as the absolute value of the amount of displacement in the x direction increases), the amounts of light received $L_1$ and $L_2$ increase. The amount of light received $L_1$ is greater than the amount of light received $L_2$ because the distance a from the light receiver 30 to the light emitter 21 is smaller than the distance b from the light receiver 30 to the light emitter 22.

Figure 4B:
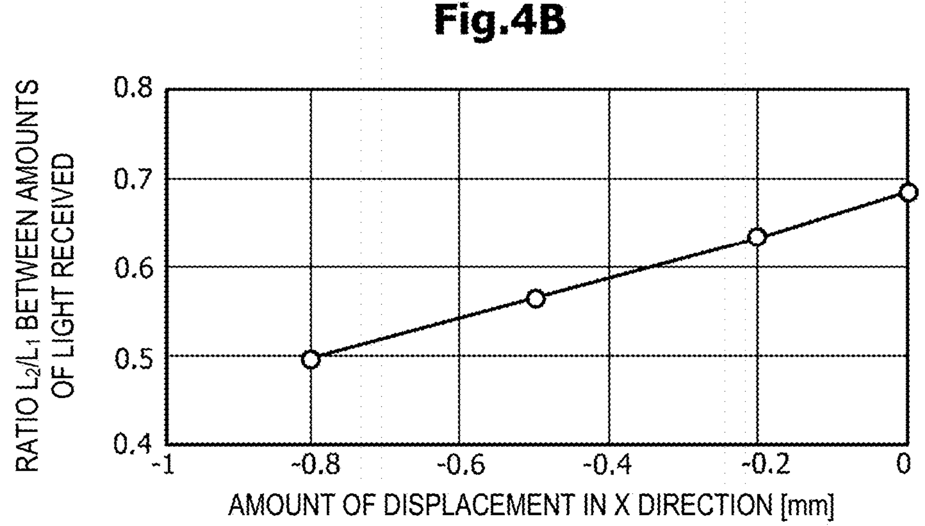
FIG. 4B is a graph illustrating a relationship between the amount of change in the distance x and a ratio $L_2/L_1$ between the amounts of light received.

FIG. 4B is a graph illustrating a relationship between the amount of displacement of the reflector 40 in the x direction and the ratio $L_2/L_1$ between the amounts of light received. The horizontal axis of the graph represents the amount of the change in the distance x in millimeter, and the vertical axis represents the ratio $L_2/L_1$ between the amounts of light received. As the top-wall portion 10B approaches the substrate 50 (in other words, as the absolute value of the amount of displacement in the x direction increases), the ratio $L_2/L_1$ between the amounts of light received decreases. The relationship between the amount of displacement in the x direction and the ratio $L_2/L_1$ between the amounts of light received as illustrated in FIG. 4B can be determined in advance by performing an evaluation test whereby the ratio $L_2/L_1$ between the amounts of light received is calculated while changing the amount of displacement in the x direction. This relationship information determined from the evaluation test is stored in the arithmetic section 68 (see FIG. 2). The arithmetic section 68 can calculate the amount of displacement in the x direction from the calculated ratio $L_2/L_1$ between the amounts of light received based on the pre-stored relationship information between the amount of displacement in the x direction and the ratio $L_2/L_1$ between the amounts of light received.

In the simulation, the luminous intensities $G_1$ and $G_2$ of the two light emitters 21 and 22 were set to be equal or substantially equal. However, it is not necessary to set the luminous intensities $G_1$ and $G_2$ to be equal or substantially equal. For example, if the relationship between the luminous intensity and the current to drive the light emitters 21 and 22 is known in advance, the light emitters 21 and 22 are not necessarily driven by an equal or substantially equal driving current. Based on the relationship between the luminous intensity and the driving current, the luminous intensity of an actual driving current can be converted to the luminous intensity of the predetermined driving current.

Next, advantageous effects according to Example 1 will be described.

If the luminous intensities $G_1$ and $G_2$ of corresponding light emitters 21 and 22 have the same or substantially the same temperature characteristics (in other words, the slope of the change in luminous intensity with respect to the change in temperature is the same or substantially the same), the ratio $G_1/G_2$ between the luminous intensities of the light emitters 21 and 22 remains constant regardless of temperature. Accordingly, the ratio $L_2/L_1$ between the amounts of light received in Equation 3 does not depend on the temperature but depends only on the distance x. In Example 1, the amount of deformation of the elastic support 10 is calculated based on the ratio $L_2/L_1$ between the amounts of light received. Accordingly, the amount of deformation of the elastic support 10 can be measured accurately without being affected by temperature change of the light emitters 21 and 22.

The change in light-receiving characteristics of the light receiver 30 due to the temperature change is substantially small compared with the change in luminous intensities of the light emitters 21 and 22. Accordingly, the change in light-receiving characteristics of the light receiver 30 due to temperature change does not largely affect the measurement results of deformation of the elastic support 10.

If the area of the reflection surface of the reflector 40 is too small, the intensity of the light that is reflected and diffused at the reflector 40 and incident on the light receiver 30 decreases, which makes it difficult to perform stable measurements. In order to obtain a sufficient amount of light at the light receiver 30, it is preferable to set the area of the reflection surface of the reflector 40 to be, for example, about 0.5 times or more as large as the area of the receiving surface of the light receiver 30.

If the area of the reflector 40 is too large, the amount of light received is affected greatly if the reflection surface of the reflector 40 inclines relative to the direction normal or substantially normal to the first plane 51. In order to reduce the negative impact due to the inclination of the reflection surface, it is preferable to set the area of the reflection surface of the reflector 40 to be, for example, about 3 times or less as large as the area of the receiving surface of the light receiver 30.

Next, a variation of Example 1 will be described.

According to the optical sensor of Example 1, the two light emitters 21 and 22 has the same or substantially the same temperature characteristics of luminous intensity, in other words, the slope of the change in luminous intensity with respect to the change in temperature is the same or substantially the same for the two light emitters 21 and 22. The two light emitters 21 and 22, however, do not necessarily have the same or substantially the same temperature characteristics of luminous intensity. For example, the two light emitters 21 and 22 to be used may have a similar tendency in the temperature characteristics of luminous intensity. For example, the two light emitters 21 and 22 may be configured such that the slope of the change in luminous intensity with respect to the change in temperature is not the same and the slope is positive or is negative for both the light emitters 21 and 22. Even in this case, the optical sensor can provide the advantageous effects that the measurement results of the deformation of the elastic support 10 are not easily affected by temperature changes compared with the case in which the optical sensor is equipped with a single light emitter.

In Example 1, the amount of deformation of the elastic support 10 (in other words, the amount of displacement of the reflector 40 (see FIG. 3) in the x direction) is calculated based on the ratio $L_2/L_1$ between the amounts of light received. Moreover, the magnitude of the force applied to the top-wall portion 10B (see FIG. 1B) may be obtained based on the amount of displacement of the reflector 40 in the x direction. For example, the arithmetic section 68 (see FIG. 2) stores the relationship information between the amount of deformation of the elastic support 10 and the magnitude of the external force applied to the elastic support 10. The arithmetic section 68 calculates the amount of deformation of the elastic support 10 and subsequently obtains the magnitude of the external force applied to the elastic support 10 using the calculated amount of deformation and the relationship information. The arithmetic section 68 may store the relationship information between the ratio $L_2/L_1$ between the amounts of light received and the magnitude of the external force applied to the elastic support 10, and the arithmetic section 68 may obtain the magnitude of the external force directly from the calculated ratio $L_2/L_1$ between the amounts of light received. Accordingly, the arithmetic section 68 may obtain other physical quantities that depend on the amount of deformation of the elastic support 10.

The top-wall portion 10B of the elastic support 10 may be configured to vibrate in response to sound waves. With this configuration, the sound waves displace the reflector 40 in the x direction. With this configuration, the optical sensor of Example 1 defines and functions as a microphone.

In Example 1, the two light emitters 21 and 22 and the one light receiver 30 are disposed on the first plane 51 of the substrate 50. The first plane 51 does not need to be the surface of the substrate 50 that supports the light emitters 21 and 22 and the light receiver 30. For example, a fixation member may be provided to position and fix the light emitters 21 and 22 and the light receiver 30 on an imaginary first plane 51.

In Example 1, the space 15 (see FIG. 1B) is the cavity surrounded by the elastic support 10 and the substrate 50. The space 15 may be filled with a soft and elastic material, such as a transparent silicone rubber, that is deformable when an external force is applied and is substantially transparent for the light in a range of wavelength output by the light emitters 21 and 22.

In Example 1, the representative points of the two light emitters 21 and 22 and the light receiver 30 are positioned on a single straight line as illustrated in FIG. 1C. The representative points, however, do not need to be positioned on the single straight line. It is sufficient that the distance a between the light receiver 30 and the light emitter 21 is different from the distance b between the light receiver 30 and the light emitter 22.

Example 2

Next, an optical sensor according to Example 2 of an example embodiment of the present invention will be described with reference to FIG. 5. The following will omit the description of the elements and configurations in common with those of the optical sensor of Example 1, which have been described with reference to FIGS. 1A to 4B.

Figures 5, 6:
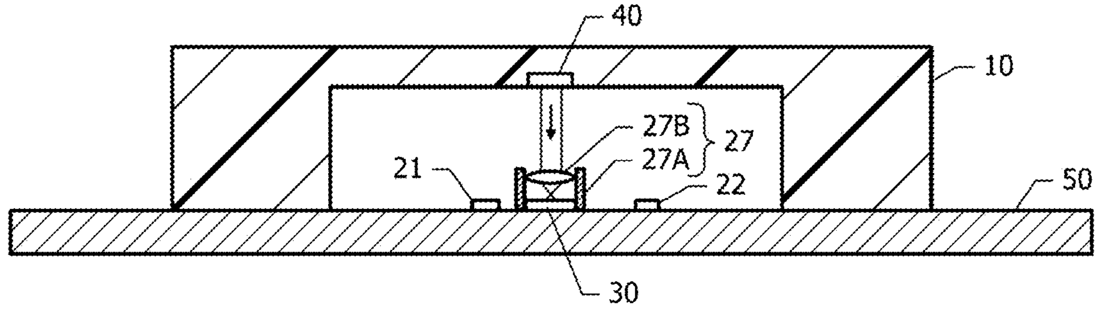
FIG. 5 is a cross-sectional view illustrating an optical sensor according to Example 2 of an example embodiment of the present invention.
FIG. 6 is a cross-sectional view illustrating an optical sensor according to Example 3 of an example embodiment of the present invention.

FIG. 5 is a cross-sectional view illustrating the optical sensor of Example 2. In Example 1, the elastic support 10 includes the side-wall portion 10A and the top-wall portion 10B that are made of the elastic material. In Example 2, however, the side-wall portion 10A and the top-wall portion 10B are made of a hard material, such as, for example, a black-colored resin or a metal plate coated with black paint on the surface. The side-wall portion 10A has a dual-tube structure including cylindrically shaped outer and inner walls. When the first plane 51 is viewed in plan, the shape of the space provided between the outer and inner walls follows the circular circumference. An elastic member 10C, such as a coil spring, is inserted in the space between the outer and inner walls.

A projection 10D is provided at the top-wall portion 10B, and the projection 10D is also inserted into the space between the outer and inner walls of the side-wall portion 10A. When the first plane 51 is viewed in plan, the projection 10D is shaped so as to follow the circular circumference. For example, the top-wall portion 10B is supported by the substrate 50 with the projection 10D and the elastic member 10C interposed therebetween. The top-wall portion 10B can be displaced in the direction normal or substantially normal to the first plane 51.

When a force is applied to the top-wall portion 10B, the elastic member 10C elastically deforms and the top-wall portion 10B and the reflector 40 attached thereto are displaced in the direction normal to the first plane 51.

Advantageous effects of Example 2 are as follows.

As is the case for Example 1, two light emitters 21 and 22 are also included in Example 2, which can reduce the negative impact of temperature change of the light emitters 21 and 22. Accordingly, the amount of deformation of the elastic support 10 can be measured accurately.

Example 3

Next, an optical sensor according to Example 3 of an example embodiment of the present invention will be described with reference to FIG. 6. The following will omit the description of the elements and configurations in common with those of the optical sensor of Example 1, which have been described with reference to FIGS. 1A to 4B.

FIG. 6 is a cross-sectional view illustrating the optical sensor of Example 3. The optical sensor of Example 3 further includes an incident light control structure 27 in addition to the elements of the optical sensor of Example 1 (see FIG. 1B). The incident light control structure 27 includes a condenser lens 27B that condenses light to be incident on the light receiver 30 and a support 27A that supports the condenser lens 27B. The condenser lens 27B condenses the light reflected and diffused at one region of the reflection surface of the reflector 40 onto the receiving surface of the light receiver 30. The incident light control structure 27 controls the light reflected and diffused at other regions of the reflection surface of the reflector 40 so as not to be incident on the receiving surface of the light receiver 30.

Advantageous effects of Example 3 are as follows. In Example 3, the region of the reflection surface of the reflector 40, which reflects and diffuses the light incident on the receiving surface of the light receiver 30, is restricted, thus reducing the negative impact of the inclination of the reflection surface of the reflector 40. In addition, even in the case of the reflector 40 being displaced in a direction parallel or substantially parallel to the first plane 51, the amount of light received by the light receiver 30 does not substantially change insofar as the region reflecting and diffusing the light toward the receiving surface of the light receiver 30 stays within the reflection surface after the reflector 40 is displaced. The displacement of the reflector 40 in the direction parallel or substantially parallel to the first plane 51 is thus compensated, which enables accurate measurement of the amount of deformation of the elastic support 10.

A variation of Example 3 is as follows.

In Example 3, the condenser lens 27B is used in the incident light control structure 27 to control the light incident on the receiving surface of the light receiver 30. The incident light control structure 27, however, may be configured differently. For example, an optical filter (otherwise called a "louver") or an optical package to limit the angle of incoming light may be used.

Example 4

Next, an optical sensor according to Example 4 of an example embodiment of the present invention will be described with reference to FIGS. 7A and 7B. The following will omit the description of the elements and configurations in common with those of the optical sensor of Example 1, which have been described with reference to FIGS. 1A to 4B.

Figure 7A:
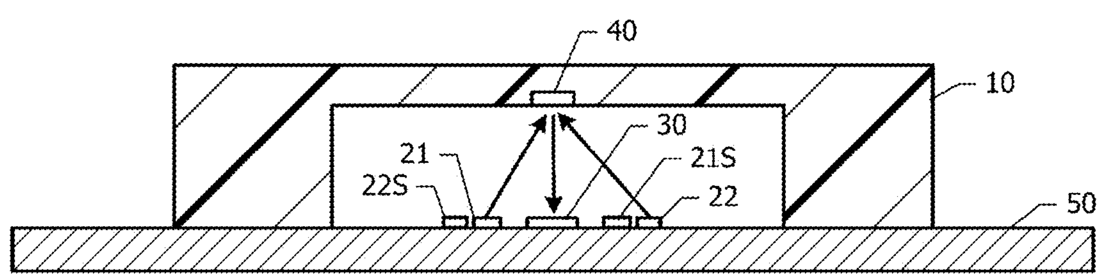
FIG. 7A is a cross-sectional view illustrating an optical sensor according to Example 4 of an example embodiment of the present invention.

FIG. 7A is a cross-sectional view illustrating the optical sensor of Example 4. The optical sensor of Example 1 (see FIG. 1B) includes two light emitters 21 and 22. On the other hand, the optical sensor of Example 4 also includes two supplementary light emitters 21S and 22S in addition to the two light emitters 21 and 22. The light emitter 21 is paired with the supplementary light emitter 21S, and the light emitter 22 is paired with the supplementary light emitter 22S. The two supplementary light emitters 21S and 22S are also provided on the first plane 51 as are the light emitters 21 and 22.

Figure 7B:
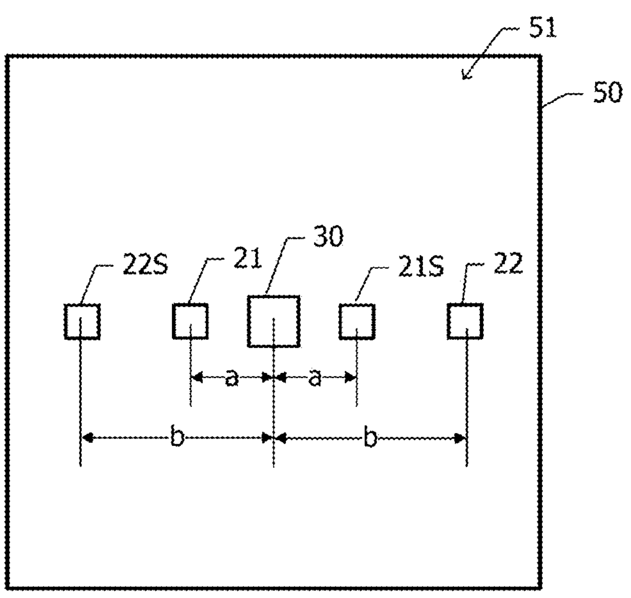
FIG. 7B is a schematic plan view illustrating a positional relationship of light emitters and supplementary light emitters of the optical sensor of Example 4.

FIG. 7B is a schematic plan view illustrating a positional relationship of the light emitters 21 and 22, the supplementary light emitters 21S and 22S, the light receiver 30 of the optical sensor of Example 4. The representative points of the pair of the light emitter 21 and the supplementary light emitter 21S are positioned point symmetrically with respect to the representative point of the light receiver 30. Similarly, the representative points of the pair of the light emitter 22 and the supplementary light emitter 22S are also positioned point symmetrically with respect to the representative point of the light receiver 30. In other words, the distance between the light receiver 30 and the supplementary light emitter 21S is equal or substantially equal to the distance a between the light receiver 30 and the light emitter 21. Similarly, the distance between the light receiver 30 and the supplementary light emitter 22S is equal or substantially equal to the distance b between the light receiver 30 and the light emitter 22.

The representative points of the two light emitters 21 and 22 and the light receiver 30 are positioned on a single straight line. Moreover, the representative points of the two supplementary light emitters 21S and 22S are also positioned on this straight line.

When the deformation of the elastic support 10 is measured, the pair of the light emitter 21 and the supplementary light emitter 21S are caused to emit light simultaneously, and the amount of light received by the light receiver 30 is measured. Subsequently, the pair of the light emitter 22 and the supplementary light emitter 22S are caused to emit light simultaneously, and the amount of light received by the light receiver 30 is measured.

Figure 8:
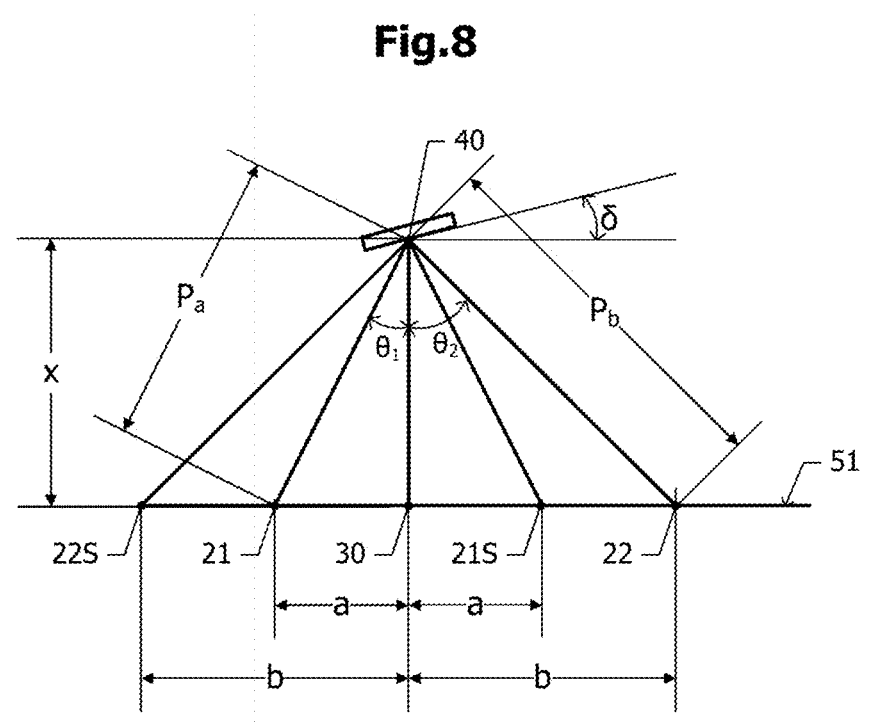

Next, an example embodiment of a method of obtaining the amount of deformation of the elastic support 10 is described concretely with reference to FIG. 8.

FIG. 8 is a schematic view illustrating a positional relationship of the light emitters 21 and 22, the supplementary light emitters 21S and 22S, the light receiver 30, and the reflector 40 of the optical sensor of Example 4. In FIG. 8, the light emitters 21 and 22, the supplementary light emitters 21S and 22S, the light receiver 30, and the reflector 40 are indicated by their representative points.

In Example 1 (see FIG. 3), the reflection surface of the reflector 40 is assumed to be parallel or substantially parallel to the first plane 51. The following, however, describes a case in which the reflection surface of the reflector 40 inclines relative to the first plane 51. The angle of inclination of the reflection surface of the reflector 40 is denoted by reference sign ">". The inclination of the reflection surface of the reflector 40 may occur if, for example, a load is applied locally to the elastic support 10 while manufacturing the optical sensor.

The reflection surface of the reflector 40 is assumed to incline with respect to the straight line passing through the representative points of the light emitters 21 and 22 and the light receiver 30. In the following description with reference to FIG. 8, the representative points of the light emitters 21 and 22, the representative points of the supplementary light emitters 21S and 22S, the representative point of the light receiver 30, and the representative point of the reflector 40 may be referred to simply as the light emitters 21 and 22, the supplementary light emitters 21S and 22S, the light receiver 30, and the reflector 40, respectively.

The distances a, b, x, $P_a$, and $P_b$ and the angles $\theta_1$ and $\theta_2$ are the same variables as those described with reference to FIG. 3. The luminous intensity of the supplementary light emitter 21S is equal or substantially equal to the luminous intensity $G_1$ of the light emitter 21, and the luminous intensity of the supplementary light emitter 22S is equal or substantially equal to the luminous intensity $G_2$ of the light emitter 22.

When the light emitter 21 and the supplementary light emitter 21S are caused to emit light, the amount of light received $L_1$ is expressed in the following equation.

Equation 4

$$L_1 = \frac{\alpha}{x^2}\frac{1}{\cos\delta}\left[\frac{G_1}{P_a^2}\{\cos(\theta_1+\delta)+\cos(\theta_1-\delta)\}\right] = \frac{\alpha}{x^2}\frac{1}{\cos\delta}\frac{G_1}{(a^2+x^2)^{3/2}}2x\cos\delta \tag{4}$$

When the light emitter 22 and the supplementary light emitter 22S are caused to emit light, the amount of light received $L_2$ is expressed in the following equation.

Equation 5

$$L_2 = \frac{\alpha}{x^2}\frac{1}{\cos\delta}\frac{G_2}{(b^2+x^2)^{3/2}}2x\cos\delta \tag{5}$$

From Equation (4) and Equation (5), the ratio of the amount of light received $L_2$ to the amount of light received $L_1$ is expressed in the following equation.

Equation 6

$$\frac{L_2}{L_1} = \frac{G_2(a^2+x^2)^{3/2}}{G_1(b^2+x^2)^{3/2}} \tag{6}$$

Also in Example 4, the ratio $L_2/L_1$ between the amounts of light received is expressed in the equation same as Equation (3) for Example 1.

Advantageous effects of Example 4 are as follows.

As is the case for Example 1, the optical sensor of Example 4 can provide the advantageous effects that the measurement of the deformation of the elastic support 10 is almost not affected by the temperature changes of the light emitters 21 and 22. Moreover, as indicated by Equation 6, the ratio $L_2/L_1$ between the amounts of light received does not depend on the angle of inclination 8 of the reflection surface of the reflector 40. Accordingly, even if the reflector 40 inclines relative to the first plane 51, the amount of deformation of the elastic support 10 can be measured accurately.

Figure 9A:
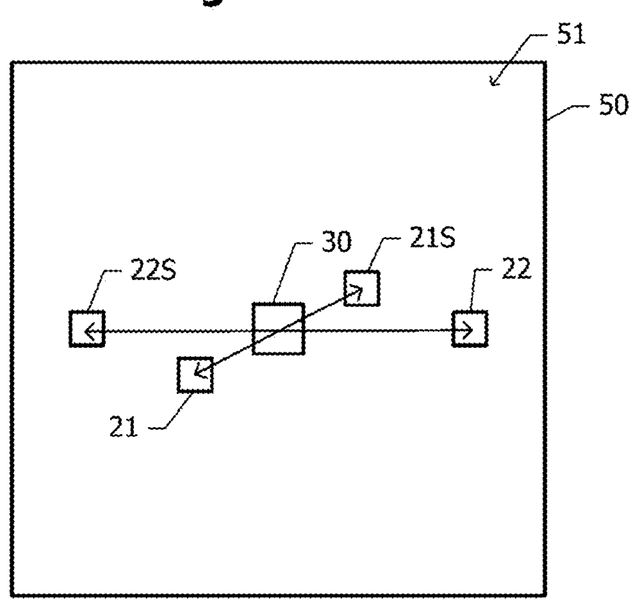
FIG. 9A is a schematic plan view illustrating a positional relationship of the light emitters, the supplementary light emitters, and the light receiver of an optical sensor according to a variation of Example 4.

Next, a variation of the optical sensor of Example 4 will be described with reference to FIG. 9A. FIG. 9A is a schematic plan view illustrating a positional relationship of the light emitters 21 and 22, the supplementary light emitters 21S and 22S, and the light receiver 30 according to the variation of the optical sensor of Example 4. In Example 4 (see FIG. 7B), the representative points of the two light emitters 21 and 22, the representative points of the two supplementary light emitters 21S and 22S, and the representative point of the light receiver 30 are positioned on the single straight line. In the variation illustrated in FIG. 9A, however, the representative points of the pair of the light emitter 21 and the supplementary light emitter 21S and the representative point of the light receiver 30 are positioned on a straight line, and the representative points of the pair of the light emitter 22 and the supplementary light emitter 22S and the representative point of the light receiver 30 are positioned on a different straight line. The straight line and the different straight line intersect each other at a predetermined angle.

As in the variation illustrated in FIG. 9A, the representative points of the light emitters 21 and 22 and the light receiver 30 are not necessarily positioned on a single straight line.

Figure 9B:
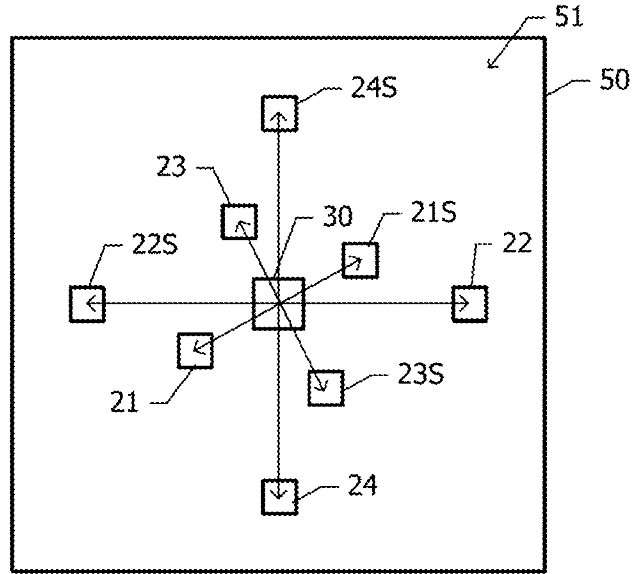
FIG. 9B is a schematic plan view illustrating a positional relationship of the light emitters, the supplementary light emitters, and the light receiver of an optical sensor according to another variation of Example 4.

Next, another variation of the optical sensor of Example 4 will be described with reference to FIG. 9B. FIG. 9B is a schematic plan view illustrating a positional relationship of light emitters 21, 22, 23, and 24, supplementary light emitters 21S, 22S, 23S and 24S, and the light receiver 30 of the optical sensor according to another variation of Example 4.

In the variation illustrated in FIG. 9B, four light emitters 21, 22, 23, and 24 and four supplementary light emitters 21S, 22S, 23S, and 24S, which are paired with respective light emitters 21, 22, 23, and 24, are provided. The representative points of the pair of the light emitter 21 and the supplementary light emitter 21S are positioned on a straight line. The representative points of the pair of the light emitter 22 and the supplementary light emitter 22S are positioned on another straight line. The representative points of the pair of the light emitter 23 and the supplementary light emitter 23S are positioned on another straight line. The representative points of the pair of the light emitter 24 and the supplementary light emitter 24S are positioned on another straight line. Moreover, these four straight lines intersect each other at the representative point of the light receiver 30.

As in the variation illustrated in FIG. 9B, the number of the light emitters may be four, for example. The number of the light emitters may be three or five or more. In such cases, the light emitters and the supplementary light emitters are preferably arranged such that the straight lines passing through the representative points of multiple pairs intersect each other at the representative point of the light receiver 30. Even if the reflection surface of the reflector 40 (see FIG. 7A) inclines in various directions, this manner of arrangement reduces the negative impact of the inclination.

Example 5

Next, an optical sensor according to Example 5 of an example embodiment of the present invention will be described with reference to FIG. 10. The following will omit the description of the elements and configurations in common with those of the optical sensor of Example 1, which have been described with reference to FIGS. 1A to 4B.

Figures 10, 11:
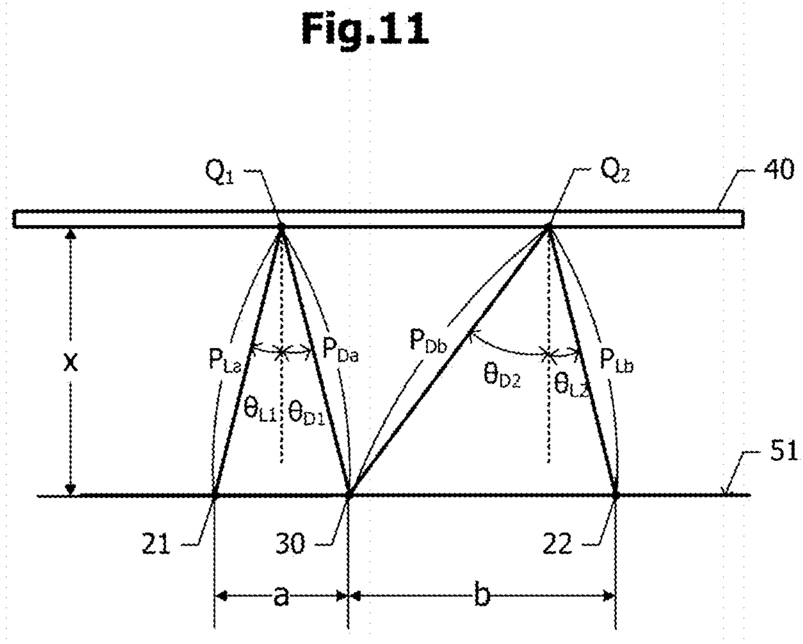
FIG. 10 is a cross-sectional view illustrating an optical sensor according to Example 5 of an example embodiment of the present invention.
FIG. 11 is a schematic view illustrating a positional relationship of the light emitters, the light receiver, and the reflector of the optical sensor of Example 5.

FIG. 10 is a cross-sectional view illustrating the optical sensor of Example 5. In Example 1 (see FIG. 1B), the area of the reflection surface of the reflector 40 is about 0.5 times or more and about 3 times or less as large as the area of the receiving surface of the light receiver 30. In Example 5, on the other hand, the top-wall portion 10B of the elastic support 10 is provided as the reflector 40, and almost the entire area of the surface of the top-wall portion 10B that faces the substrate 50 defines and functions as the reflection surface. In other words, when the first plane 51 is viewed in plan, the two light emitters 21 and 22 and the light receiver 30 are encompassed by the reflector 40. The side-wall portion 10A is made, for example, of a black elastic member, such as a black silicone rubber.

Light emitted by the light emitter 21 is reflected and diffused at an arbitrary point $Q_1$ on the reflection surface of the reflector 40, and a portion of the light is incident on the light receiver 30. Light emitted by the light emitter 22 is reflected and diffused at an arbitrary point $Q_2$ on the reflection surface of the reflector 40, and a portion of the light is incident on the light receiver 30.

When a load is applied to the top-wall portion 10B, the side-wall portion 10A deforms elastically, and the reflector 40 comes closer to the first plane 51 while the reflection surface of the reflector 40 maintains the position parallel or substantially parallel to the first plane 51. When the distance x between the reflector 40 and the first plane 51 changes, the amount of light received by the light receiver 30 also changes. The arithmetic section 68 (see FIG. 2) calculates the amount of deformation of the elastic support 10 (i.e., the amount of displacement of the top-wall portion 10B) based on the change in the amount of light received.

Next, an example of a method of obtaining the amount of deformation of the elastic support 10 is described concretely with reference to FIG. 11. FIG. 11 is a schematic view illustrating a positional relationship of the light emitters 21 and 22, the light receiver 30, and the reflector 40. In FIG. 11, the light emitters 21 and 22 and the light receiver 30 are indicated by their representative points.

The light emitted by the light emitter 21 is reflected and diffused at an arbitrary point $Q_1$ on the reflection surface of the reflector 40, and a portion of the light is incident on the light receiver 30. The distance from the light emitter 21 to the point $Q_1$ is denoted by reference sign "$P_{La}$", and the distance from the point $Q_1$ to the light receiver 30 is denoted by reference sign "$P_{Da}$". The incident angle of the light coming from the light emitter 21 at the point $Q_1$ is denoted by reference sign "$\theta_{L1}$", and the reflection angle of the light that is reflected at the point $Q_1$ and incident on the light receiver 30 is denoted by reference sign "$\theta_{D1}$".

Similarly, the light emitted by the light emitter 22 is reflected and diffused at an arbitrary point $Q_2$ on the reflection surface of the reflector 40, and a portion of the light is incident on the light receiver 30. The distance from the light emitter 22 to the point $Q_2$ is denoted by reference sign "$P_{Lb}$", and the distance from the point $Q_2$ to the light receiver 30 is denoted by reference sign "$P_{Db}$". The incident angle of the light coming from the light emitter 22 at the point $Q_2$ is denoted by reference sign "$\theta_{L2}$", and the reflection angle of the light that is reflected at the point $Q_2$ and incident on the light receiver 30 is denoted by reference sign "$\theta_{D2}$".

The amount of light $L_{LQ1}$ that comes to the point Q1 from the light emitter 21 is expressed in the following equation.

Equation 7

$$L_{LQ1} = G_1 \cdot \cos^N\theta_{L1} \cdot \frac{\cos\theta_{L1}}{P_{La}^2} \tag{7}$$

Here, "$\cos^N$" represents the angular characteristics of the luminous intensity of the light emitter 21. Note that the $\cos^N$ is an example for expressing the angular characteristics of the luminous intensity. It is not necessary to assume that the luminous intensity follows the cosine distribution, and the angular characteristics of the luminous intensity may be expressed in any other functions.

The amount of light $L_{Q1}$ that the light receiver 30 receives from the point $Q_1$ is expressed in the equation below. In this equation, "$\cos^M$" represents the angular characteristics of the amount of light received by the light receiver 30. Note that the $\cos^M$ is an example for expressing the angular characteristics of the amount of light. It is not necessary to assume that the amount of light follows the cosine distribution, and the angular characteristics of the amount of light may be expressed in any other functions.

Equation 8

$$\begin{aligned} L_{Q1} &= \alpha \cdot L_{LQ1} \cdot \cos\theta_{D1} \cdot \frac{\cos^M\theta_{D1}}{P_{D1}^2} \\ &= \alpha \cdot G_1 \cdot \cos^N\theta_{L1} \cdot \cos\theta_{L1} \cdot \cos\theta_{D1} \cdot \frac{\cos^M\theta_{D1}}{(P_{L1}^2 \cdot P_{D1}^2)} \end{aligned} \tag{8}$$

Similarly, the light is emitted by the light emitter 22, reflected at the point $Q_2$, and incident on the light receiver 30. The amount of light $L_{Q2}$ incident on the light receiver 30 is expressed in the following equation.

Equation 9

$$L_{Q2} = \alpha \cdot G_2 \cdot \cos^N\theta_{L2} \cdot \cos\theta_{L2} \cdot \cos\theta_{D2} \cdot \frac{\cos^M\theta_{D2}}{(P_{L2}^2 \cdot P_{D2}^2)} \tag{9}$$

The amount of light received $L_1$, which is emitted by the light emitter 21, reflected and diffused by the reflector 40, and incident on the light receiver 30, is expressed in the corresponding equation below. Similarly, the amount of light received $L_2$, which is emitted by the light emitter 22, reflected and diffused by the reflector 40, and incident on the light receiver 30, is also expressed in the corresponding equation below.

Equations 10

$$L_1 = \sum L_{Q1} \tag{10}$$

-continued $$L_2 = \sum L_{Q2}$$

The symbol "Σ" in the right side of the first equation of Equations 10 means the sum, which is obtained by adding up $L_{Q1}$ for all the points $Q_1$ over the entire reflection surface of the reflector 40. Similarly, the symbol "Σ" in the right side of the second equation in Equation (10) means the sum, which is obtained by adding up $L_{Q2}$ for all the points $Q_2$ over the entire reflection surface of the reflector 40.

The ratio $L_2/L_1$ of the amounts of light received is expressed in the following equation.

Equation 11

$$\frac{L_2}{L_1} = \frac{\sum L_{Q1}}{\sum L_{Q2}} \tag{11}$$

From Equation 8 and Equation 9, when the luminous intensities $G_1$ and $G_2$ change at a rate K due to the temperature change of the light emitters 21 and 22, the amounts of light $L_{Q1}$ and $L_{Q2}$ are both multiplied by the rate K. In this case, the ratio $L_2/L_1$ between the amounts of light received expressed in Equation (11) does not change. Accordingly, the changes in respective luminous intensities $G_1$ and $G_2$ due to the temperature change are canceled, and the measurement results of the deformation of the elastic support 10 is almost not affected by the temperature change.

Advantageous effects of Example 5 are as follows.

As is the case for Example 1, two light emitters 21 and 22 are also used in Example 5, which can reduce the negative impact of the temperature change of the light emitters 21 and 22. Accordingly, the amount of deformation of the elastic support 10 can be measured accurately.

Example 6

Next, an optical sensor according to Example 6 of an example embodiment of the present invention will be described with reference to FIGS. 12 and 13. The following will omit the description of the elements and configurations in common with those of the optical sensor of Example 1, which have been described with reference to FIGS. 1A to 4B.

Figure 12:
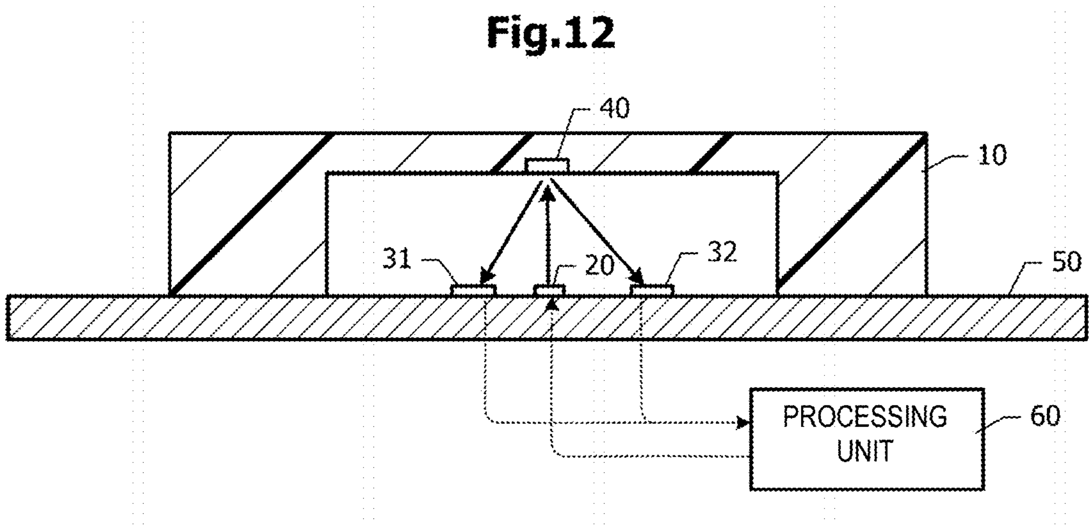
FIG. 12 is a cross-sectional view illustrating an optical sensor according to Example 6 of an example embodiment of the present invention.

FIG. 12 is a cross-sectional view illustrating the optical sensor of Example 6. In Example 1 (see FIG. 1B), two light emitters 21 and 22 and one light receiver 30 are disposed on the first plane 51. In Example 6, on the other hand, one light emitter 20 is provided at the position of the light receiver 30 of Example 1, and two light receivers 31 and 32 are provided at respective positions of the two light emitters 21 and 22 of Example 1.

The temperature dependence on the sensitivity is the same or substantially the same for the two light receivers 31 and 32. For example, the slope of the change in sensitivity with respect to the change in temperature is the same or substantially the same for the two light receivers 31 and 32. The tendency of the change in sensitivity with respect to the change in temperature may be the same or substantially the same for the two light receivers 31 and 32. For example, the slope of the change in sensitivity with respect to the change in temperature may be positive or may be negative for both the light receivers 31 and 32. For example, it is preferable to use products having the same model number for the light receivers 31 and 32. For example, it is preferable to use products of the same lot for the light receivers 31 and 32, and it is more preferable to use products made from the same wafer.

Figure 13:
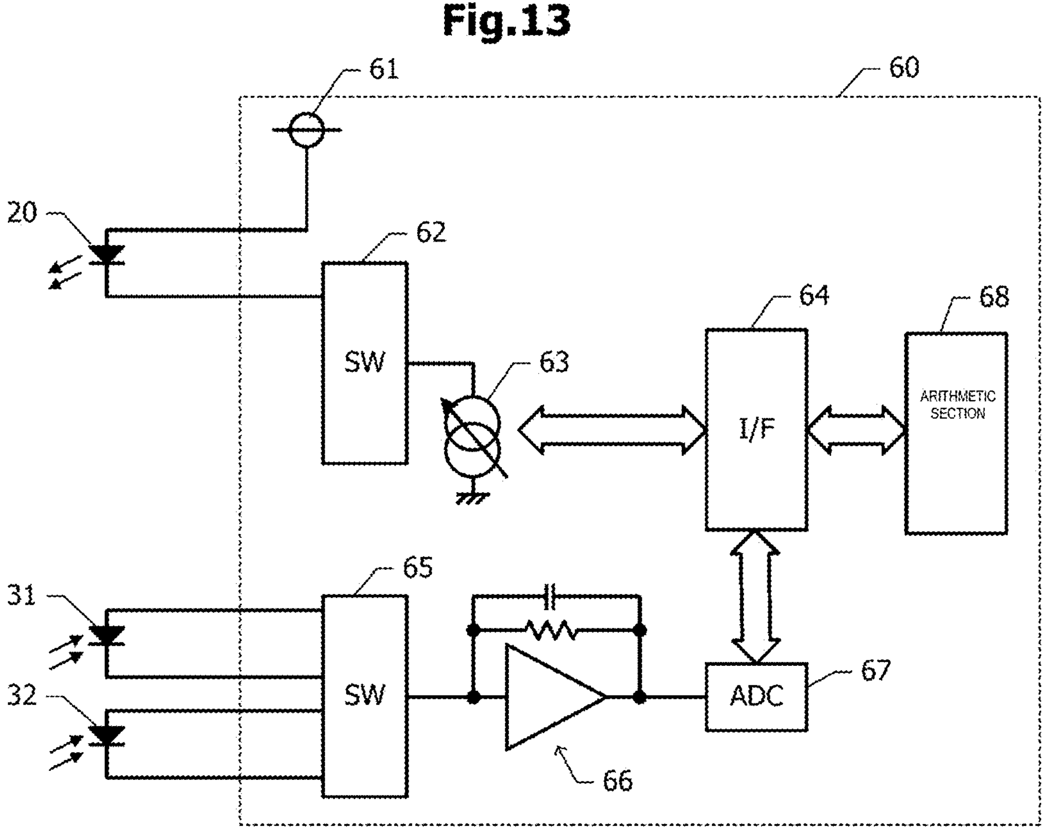
FIG. 13 is a block diagram illustrating a processor of the optical sensor of Example 6.

FIG. 13 is a block diagram illustrating the processor 60 of the optical sensor according to Example 6. In Example 1 (see FIG. 2), two light emitters 21 and 22 are coupled to the switch matrix 62, and one light receiver 30 is coupled to the switch matrix 65. In Example 6, on the other hand, one light emitter 20 is coupled to the switch matrix 62, and two light receivers 31 and 32 are coupled to the switch matrix 65.

When the light emitter 20 emits light, the light receiver 31 receives an amount of light, which is referred to as an "amount of light received $L_1$", and the light receiver 32 receives an amount of light, which is referred to as an "amount of light received $L_2$". The arithmetic section 68 calculates the ratio $L_2/L_1$ between the amounts of light received, and thereby calculates the amount of deformation of the elastic support 10.

Advantageous effects of Example 6 are as follows.

In Example 6, even if the luminous intensity of the light emitter 20 changes due to temperature change, the ratio $L_2/L_1$ between the amounts of light received by the two light receivers 31 and 32 almost does not change. This can reduce the negative impact of the temperature change of the light emitter 20. Accordingly, the amount of deformation of the elastic support 10 can be measured accurately.

A variation of Example 6 is as follows.

As is the case for Example 2 illustrated in FIG. 5, the elastic support 10 of Example 6 may use an elastic member, such as a coil spring. The optical sensor of Example 6 may be configured the same as or similarly to that of Example 3 illustrated in FIGS. 7A and 7B. More specifically, supplementary light receivers are provided such that one of the supplementary light receivers is paired with the light receiver 31 and the other supplementary light receiver is paired with the light receiver 32. Moreover, three or more light receivers may be provided. Moreover, the entire or substantially the entire top-wall portion 10B may define and functions as the reflector 40 as is the case for Example 5 illustrated in FIG. 10.

The optical sensors described herein are merely examples and configurations described in different examples can be partially replaced or combined with one another. The similar advantageous effects derived from the similar configurations of different examples have not been repeated. The examples are not intended to limit the present invention. It is apparent that for example, various alterations, modifications, and different combinations can be made easily by those skilled in the art.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An optical sensor comprising:

two light emitters with a same or substantially a same temperature dependence of luminous intensity of the light;

a light receiver;

a reflector to reflect and diffuse light emitted by the light emitters and provided such that a portion of the reflected light is incident on the light receiver;

an elastic support to support the reflector with respect to the two light emitters and the light receiver and deformable due to an external force to change a relative position of the reflector with respect to the two light emitters and the light receiver; and a processor configured or programmed to calculate a physical quantity that depends on an amount of deformation of the elastic support based on a ratio between two amounts of light received by the light receiver when respective ones of the two light emitters emit light at different timings; wherein the two light emitters and the light receiver are fixed relative to each other; and a distance from one of the two light emitters to the light receiver is different from a distance from another light emitter of the two light emitters to the light receiver.

2. The optical sensor according to claim 1, wherein the two light emitters and the light receiver are positioned on an imaginary common first plane.

3. The optical sensor according to claim 2, further comprising:

two supplementary light emitters on the first plane and paired with respective ones of the two light emitters; wherein the light emitter and the supplementary light emitter of each pair are provided at point symmetrical positions with respect to the light receiver.

4. The optical sensor according to claim 2, wherein an area of a reflection surface of the reflector is about 0.5 times or more and about 3 times or less as large as an area of a receiving surface of the light receiver; and the reflector is positioned on a straight line perpendicular or substantially perpendicular to the first plane and passes through the light receiver.

5. The optical sensor according to claim 1, further comprising an incident light controller configured or programmed to allow light reflected by a region of the reflector to enter the light receiver and not allow light reflected by other regions of the reflector to enter the light receiver.

6. The optical sensor according to claim 2, wherein, when the first plane is viewed in plan, the two light emitters and the light receiver are covered by the reflector.

7. The optical sensor according to claim 1, wherein the processor is configured or programmed to store relationship information between the ratio between the two amounts of light received and a magnitude of the external force applied to the elastic support; and the processor is configured or programmed to calculate a magnitude of the external force applied to the elastic support as the physical quantity that depends on the amount of deformation.

8. The optical sensor according to claim 1, wherein the elastic support has a cylindrical shape.

9. The optical sensor according to claim 1, wherein the elastic support includes a black-colored silicone rubber.

10. The optical sensor according to claim 1, wherein the elastic support includes a side-wall portion and a top-wall portion.

11. The optical sensor according to claim 10, wherein the side-wall portion has a hollow cylindrical shape.

12. The optical sensor according to claim 1, wherein the two light emitters are light-emitting diodes.

13. An optical sensor comprising:

a light emitter;

two light receivers with a same or substantially a same temperature dependence of sensitivity;

a reflector to reflect light emitted by the light emitter and provided such that a portion of the reflected light is incident on the two light receivers;

an elastic support to support the reflector with respect to the light emitter and the two light receivers and deformable due to an external force to change a relative position of the reflector with respect to the light emitter and the two light receivers; and a processor configured or programmed to calculate a physical quantity that depends on an amount of deformation of the elastic support based on a ratio between two amounts of light received by respective ones of the two light receivers when the light emitter emits light; wherein the light emitter and the two light receivers are fixed relative to each other, and a distance from one of the two light receivers to the light emitter is different from a distance from another light receiver of the two light receivers to the light emitter.

14. The optical sensor according to claim 13, wherein the elastic support has a cylindrical shape.

15. The optical sensor according to claim 13, wherein the elastic support includes a black-colored silicone rubber.

16. The optical sensor according to claim 13, wherein the elastic support includes a side-wall portion and a top-wall portion.

17. The optical sensor according to claim 16, wherein the side-wall portion has a hollow cylindrical shape.

18. The optical sensor according to claim 13, wherein the light emitter is a light-emitting diode.

* * * * *